July 21, 1931.  D. BALACHOWSKY ET AL  1,815,178
PROCESS OF PRODUCING A COMBUSTIBLE CHARGE FOR
USE IN INTERNAL COMBUSTION ENGINES
Original Filed Jan. 26, 1927
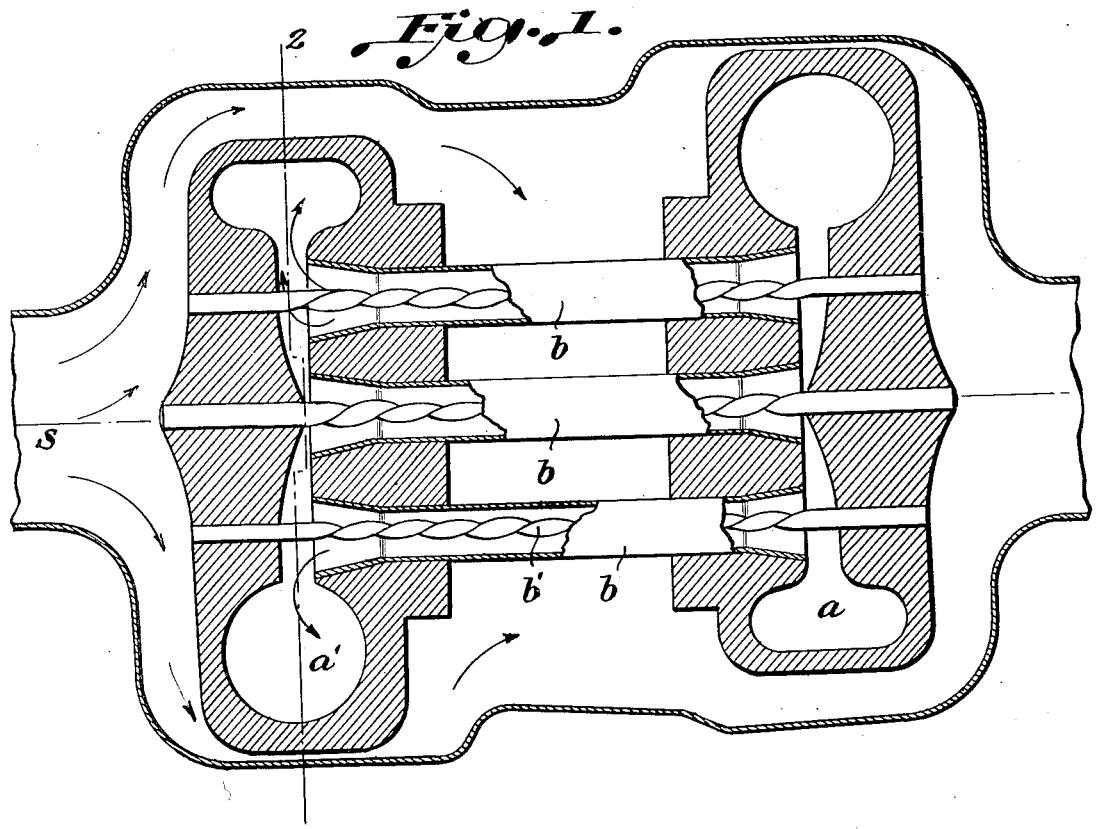
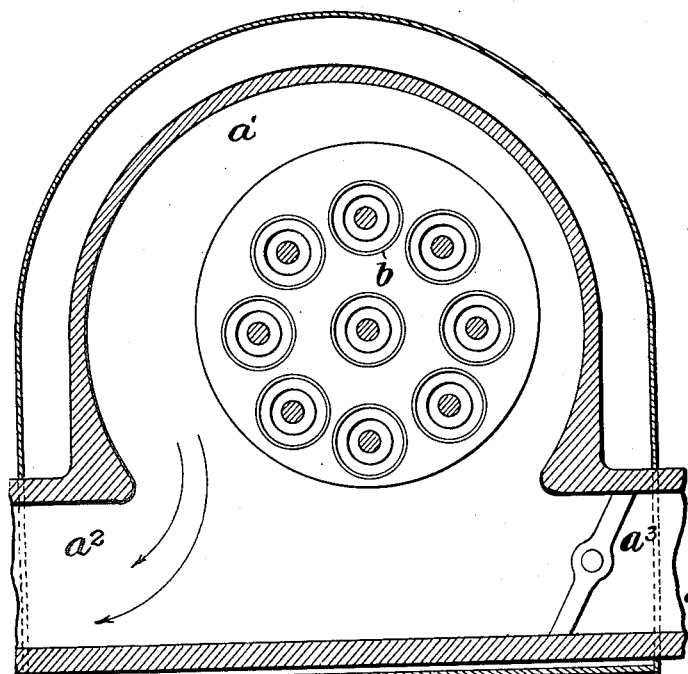
Inventor;
Dmity Balachowsky
and Philippe Caire,
By Emil Bonnelyche
Atty.

Patented July 21, 1931

1,815,178

UNITED STATES PATENT OFFICE

DMITRY BALACHWSKY AND PHILIPPE CAIRE, OF PARIS, FRANCE, ASSIGNORS TO SOCIÉTÉ BREVETS CATALEX, OF GENEVA, SWITZERLAND

PROCESS OF PRODUCING A COMBUSTIBLE CHARGE FOR USE IN INTERNAL COMBUSTION ENGINES

Original application filed January 26, 1927, Serial No. 163,816, and in France January 27, 1926. Divided and this application filed October 10, 1928. Serial No. 311,663.

This invention relates to a process for producing a combustible charge for use in internal combustion engines, of the kind in which a rich mixture of hydrocarbon and air is heated and agitated and then mixed with additional air.

This application is a continuation in part of our earlier application, Serial No. 40,389, filed June 29, 1925.

The process according to the invention consists in atomizing the hydrocarbon with a quantity of air depending upon the quantity of carbon produced by subsequent catalysis, and then dividing the rich mixture as completely as possible by causing it to pass through tubes, formed of one of the metals which are known, when heated, to effect the catalytic decomposition of hydrocarbons, each tube containing a rod made of one of the metals aforesaid and twisted or otherwise formed so as to give a gyratory or whirling motion to the rich mixture. The said tubes are heated by exhaust gases to 300–350° C.; and after having passed through them, the mixture is given a further whirling motion, and secondary air is added in sufficient quantity to produce a combustible mixture.

The atomizing of the liquid hydrocarbon is effected with only a part of the air necessary for the combustion of the charge, and the secondary air which is required is not added until the initial mixture has undergone catalysis. The air contained in the initial mixture acts to oxidize immediately the carbon which is liberated when cracking takes place and which would otherwise be apt to deposit, the oxidized carbon being carried away in the gas stream. The secondary air, as will be understood, restores in the mixture the proper proportion of combustion or oxidizing agent.

In the accompanying drawings, Figure 1 is a longitudinal sectional view of a form of apparatus for carrying out the process constituting the invention, and Fig. 2 is a vertical cross-section on line 2—2, Fig. 1.

Referring to Fig. 1, $a$ and $a'$ indicate two hollow heads of spiral or coil form, similar to the casing of a centrifugal pump or a fan, connected together by means of a bundle of tubes $b$. Rods $b'$ are arranged axially in these tubes having, for instance, a twisted or screw-shaped construction, and said rods as well as the tubes themselves, should, preferably, be made of a metal the catalyzing action of which assists decomposition. By way of example, iron or copper may be mentioned, but other metals might also be used. The rods are connected with the very body of the coils; the purpose being to produce, while breaking up the gas current into fine, thin streams, shocks of liquid particles and globules that are not yet vaporized and decomposed against the walls.

The mixture of air and heavy hydrocarbon coming from an ordinary carburetor enters the right-hand coil $a$ (the inlet of which does not appear in Figs. 1 and 2 because it opens into the coil in front of the plane of Fig. 1), whirls about in said coil and enters the tube nest or bundle $b$, and then passes into the outlet coil $a'$ which it leaves by a passage or conduit $a^2$ connected to the engine. The circulation of the mixture through the catalyzer is effected, of course, by the suction of the engine, and the unit formed by the two coils, heads or casings and the tube nest or bundle is heated externally by the hot exhaust gases from the engine which enter the catalyzer through the inlet $s$ and leave it by way of the outlet $s'$. The catalyzer itself should, by preference, be constructed of metal having as intense a catalyzing action as possible; iron or copper, for example, as mentioned above.

In operation, and to effect atomization of the hydrocarbon, an amount of air is used which is less than that required for combustion of the charge, as has already been stated, but which, nevertheless, must be sufficient to oxidize the carbon liberated at the moment of cracking. The secondary air subsequently added is supplied through a pipe or passage $a^3$ that opens tangentially into the outlet coil $a'$, as represented in Fig. 2, so that the mixture will have undergone catalytic decomposition as well as an intense agitation (produced by the twisted rods $b'$) by the time the secondary air is admitted to it. Hence, the amount of mixture initially treated is minimized, so to say, and there is no danger of it cooling the apparatus. The secondary air thus supplied to the mixture may be either hot or cold.

No claim is made herein for the apparatus employed for carrying out the process above described, such apparatus forming the subject of our prior pending application No. 163,816, filed January 26, 1927, of which the present case is a division.

We claim as our invention:—

1. A process of producing a combustible charge for use in internal combustion engines, comprising the steps of atomizing a liquid hydrocarbon with only a part of the air required for combustion of the charge; subjecting the mixture of air and hydrocarbon to a stirring action while dividing it into thin streams; subjecting such streams to the action of a catalyst heated to a suitable temperature of approximately 300° to 350° C. to catalyze the hydrocarbon, whereby the air of the mixture oxidizes partially the products liberated by catalysis; and adding sufficient secondary air to support combustion after the initial mixture has undergone catalysis.

2. A process of producing a combustible charge for use in internal combustion engines, comprising the steps of atomizing a liquid hydrocarbon with a quantity of air less than that required for combustion of the charge; subjecting the mixture of air and hydrocarbon to a stirring action in the presence of a catalyst heated to a suitable temperature of approximately 300° to 350° C., whereby the air of the mixture oxidizes partially the product liberated by catalysis; and adding sufficient secondary air to support combustion after the initial mixture has undergone catalysis.

In testimony whereof we affix our signatures.

DMITRY BALACHOWSKY.
PHILIPPE CAIRE.